United States Patent
Zwaan et al.

(10) Patent No.: US 10,124,990 B2
(45) Date of Patent: Nov. 13, 2018

(54) MECHANICAL BRAKE INTERRUPTER DEVICE

(71) Applicant: Safeworks, LLC, Tukwila, WA (US)

(72) Inventors: Olaf Zwaan, Antwerp (BE); Dirk Miseur, Wolvertem (BE); Thijmen Put, Antwerp (BE)

(73) Assignee: SafeWorks, LLC, Tukwila, WA (US)

( * ) Notice: Subject to any disclaimer, the term of this patent is extended or adjusted under 35 U.S.C. 154(b) by 0 days.

(21) Appl. No.: 15/690,088

(22) Filed: Aug. 29, 2017

(65) Prior Publication Data
US 2018/0057311 A1    Mar. 1, 2018

Related U.S. Application Data

(60) Provisional application No. 62/380,958, filed on Aug. 29, 2016.

(51) Int. Cl.
   *B66B 5/02*    (2006.01)
   *F16D 63/00*   (2006.01)

(52) U.S. Cl.
   CPC .............. *B66B 5/02* (2013.01); *B66B 5/027* (2013.01); *F16D 63/008* (2013.01)

(58) Field of Classification Search
   CPC .......... B66B 5/02; B66B 5/027; F16D 63/008
   See application file for complete search history.

(56) References Cited

U.S. PATENT DOCUMENTS

| | | | | |
|---|---|---|---|---|
| 2,274,000 A | * | 2/1942 | Sahlin | B66B 5/22 187/350 |
| 3,980,161 A | * | 9/1976 | Mauldin | B61H 9/02 188/188 |
| 4,254,941 A | * | 3/1981 | Tanson | B66D 5/16 188/188 |
| 4,650,036 A | * | 3/1987 | Matsuda | B66B 9/00 182/142 |

(Continued)

FOREIGN PATENT DOCUMENTS

EP    1857398 A2    11/2007

OTHER PUBLICATIONS

International Patent Application No. PCT/US2017/49195; Int'l Written Opinion and the Search Report; dated Nov. 16, 2017; 6 pages.

*Primary Examiner* — Michael A Riegelman
(74) *Attorney, Agent, or Firm* — Baker & Hostetler LLP

(57) ABSTRACT

A mechanical brake interrupter for a lift or other similar suspended platform allows for stopping an emergency controlled descent during a power outage when an obstruction is present below. The mechanical brake interrupter includes a manual brake handle, a control collar, a coupling member, and an activation lever. The manual brake handle is used to manipulate a brake line for performing an emergency controlled descent. The coupling member is slidably connected to the control collar, and the activation lever is used to releasably lock the control collar in an armed position and unlock the control collar in an activated position. Rotating the control collar correspondingly rotates the coupling mem- (Continued)

ber such that the manual brake handle selectively engages the coupling member when the control collar is in the armed position, and the manual brake handle does not selectively engage the coupling member when the control collar is in the activated position.

7 Claims, 11 Drawing Sheets

(56) References Cited

U.S. PATENT DOCUMENTS

| | | | | |
|---|---|---|---|---|
| 5,377,786 A * | 1/1995 | Nakagawa | ............... | B66B 5/044 187/276 |
| 5,425,435 A * | 6/1995 | Gregory | ................... | B66D 5/14 188/264 A |
| 5,645,142 A * | 7/1997 | Kraemer | ................... | B66B 5/22 182/148 |
| 5,738,339 A * | 4/1998 | Kuryu | ................. | B66D 1/7415 182/234 |
| 5,971,109 A | 10/1999 | Aulanko et al. | | |
| 6,003,636 A * | 12/1999 | Yumura | .................... | B66B 5/22 187/376 |
| 6,021,872 A * | 2/2000 | Sevilleja | ................. | B66B 5/027 187/266 |
| 6,082,506 A * | 7/2000 | Huang | ..................... | B66D 5/16 187/372 |
| 6,179,090 B1 * | 1/2001 | Casas | ...................... | B66B 5/027 187/377 |
| 6,273,216 B1 * | 8/2001 | Kocher | ................... | B66B 5/027 187/377 |
| 6,374,953 B1 * | 4/2002 | Casas | ....................... | B66D 5/08 187/314 |
| 6,817,453 B2 * | 11/2004 | Koeppe, Jr. | ............. | B66B 5/027 188/156 |
| 9,764,926 B2 * | 9/2017 | Saarelainen | ............ | B66B 5/027 |
| 2005/0103576 A1 * | 5/2005 | Engstrom | ............... | B66B 5/027 187/287 |
| 2016/0332844 A1 * | 11/2016 | Polin | ........................ | B66D 5/14 |
| 2018/0073579 A1 * | 3/2018 | Young | ................... | F16D 63/008 |

* cited by examiner

MECHANICAL BRAKE INTERRUPTER DEVICE

CROSS REFERENCE TO RELATED APPLICATIONS

This application claims benefit under 35 U.S.C. § 119(e) of Provisional U.S. patent application No. 62/380,958, filed Aug. 29, 2016, the contents of which are incorporated herein by reference in its entirety.

TECHNICAL FIELD

This disclosure generally relates to a brake interrupter device for interrupting a vertical descent of an elevator, a lift, or other similar suspended platform. More particularly, this disclosure relates to a mechanical brake interrupter for interrupting an emergency controlled descent of an elevator or lift or other similar suspended platform when an obstruction is located below the elevator or lift or other suspended platform.

BACKGROUND

Elevators, lifts, and other similar suspended platforms, are commonly used to provide vertical transportation in buildings, towers, bridges, and other tall structures. Typical elevators, lifts, and other similar suspended platforms include baskets, cages, carts, platforms, and other such loading vessels capable of transporting people and objects. Conventional elevators, lifts, and other similar suspended platforms also include a hoist mechanism having a motor connected to a system of suspension cables and pulleys for raising and lowering the loading vessel.

Various types of braking systems are also typically used to protect passengers and cargo from free-falling and crashing to the ground in certain circumstances, such as if a cable breaks or if the motor fails. For instance, a power failure may cause the brake to engage in order to prevent the elevator from falling. However, passengers and cargo can become trapped in the elevator while the elevator remains stuck in the braked position for an extended period of time until either power is restored or emergency responders come to the rescue. Thus, there is a need to provide a manual braking system that allows for an emergency controlled descent of the elevator in order to reach the ground safely when there is a loss of power. Further, there also exists a need to provide a mechanical brake interrupter in order to minimize or prevent impact with a person or other obstruction underneath the elevator during such an emergency controlled descent.

SUMMARY

When an electric motor and hoist system of an elevator, a lift, or other similar suspended platform, experiences a loss of power, the lift or other similar suspended platform may be able to descend under an emergency controlled descent. For instance, when an operator releases a brake manually, a braking system may control the speed of the lift or other similar suspended platform while descending. However, impact with an obstruction located under the lift or other similar suspended platform during the emergency controlled descent may occur due to a power outage, which would prevent activation of any electrical switches normally configured to stop the lift or other similar suspended platform upon detection of the obstruction. Thus, there is a need to have a system that mechanically interrupts such an emergency controlled descent of a lift or other similar suspended platform when an obstruction is detected.

The foregoing needs are met, to a great extent, by various implementations of the mechanical brake interrupter device according to this disclosure. In accordance with one implementation, a mechanical brake interrupter device for a lift or other similar suspended platform may include a manual brake handle, a control collar, a coupling member, and an activation lever. The manual brake handle may be configured to manipulate a brake line for performing an emergency controlled descent of the lift or other similar suspended platform, which may be coupled to a hoist. The control collar may be rotatable between an armed position and an activated position. The coupling member may have an upper portion connected to the brake line, a lower portion selectively engageable with the manual brake handle, and an intermediate portion slidably connected to the rotatable control collar. The activation lever may be pivotable and configured to releasably lock the control collar in the armed position and unlock the control collar in the activated position. Rotation of the control collar may correspondingly rotate the coupling member such that the manual brake handle selectively engages the coupling member when the control collar is in the armed position, and the manual brake handle does not selectively engage the coupling member when the control collar is in the activated position.

In operation, the mechanical brake interrupter disables the manual brake handle to activate the manual brake of the hoist. When a bottom brake interrupter section of the lift or other similar suspended platform is activated by contacting the obstruction, an activation line may be pulled outward from an upper brake interrupter section which deactivates a lever, such as a spring-loaded lever. Actuation of the lever disables the brake handle from activating the motor's mechanical brake. The brake interrupter may be reset to an armed position by turning a reset handle, thereby allowing the manual descent lever to be re-activated again if the obstruction is cleared away from under the lift or other similar suspended platform to a safe position.

Certain implementations of the mechanical brake interrupter device have been outlined so that the detailed description below may be better understood. There are, of course, additional implementations that will be described below and which will form the subject matter of the claims. The details of one or more examples are set forth in the accompanying drawings and the description below. Other features, objects, and advantages of the disclosed examples will be apparent from the description and drawings, and from the claims.

BRIEF DESCRIPTION OF THE DRAWINGS

The foregoing summary, as well as the following detailed description of various examples, is better understood when read in conjunction with the appended drawings. For the purposes of illustration, specific examples were selected to be shown in the drawings; however, the present disclosure is not limited to the specific methods and instrumentalities disclosed. In the drawings.

Implementations of the mechanical brake interrupter are described with reference to the drawings, in which like reference numerals refer to like parts throughout.

DETAILED DESCRIPTION OF ILLUSTRATIVE EMBODIMENTS

Figure 1:
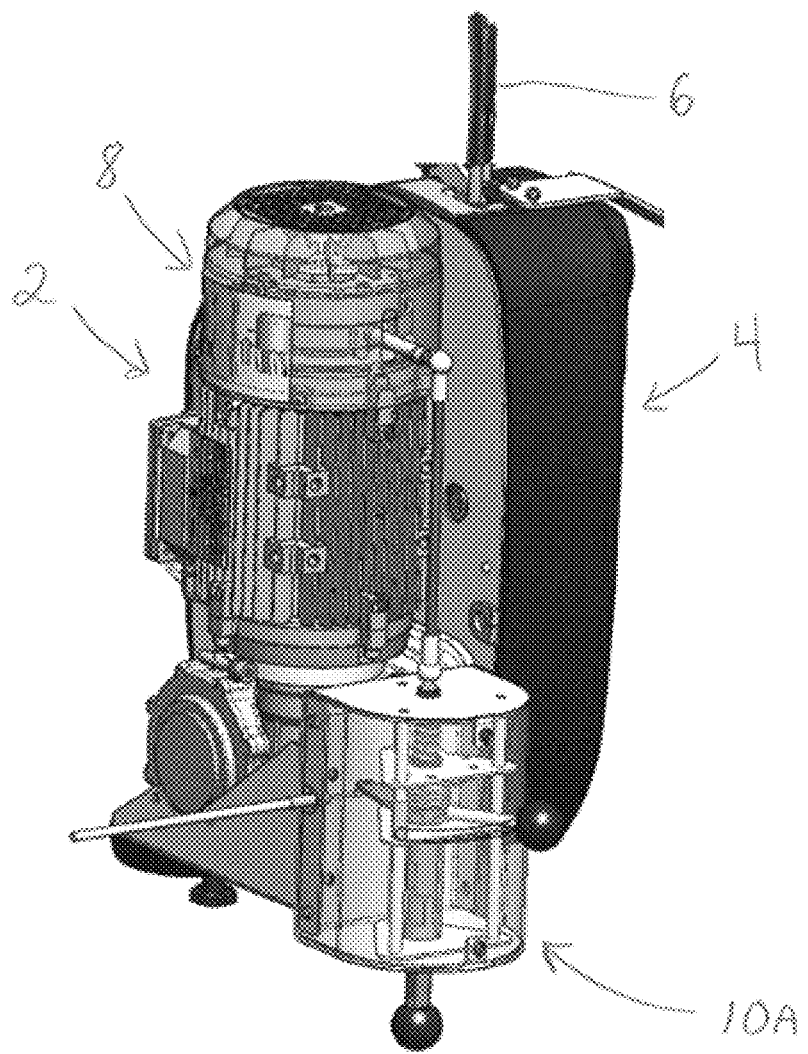
FIG. 1 illustrates a perspective view of a drive mechanism connected to a control section of a mechanical brake interrupter according to the present disclosure.

Certain specific details are set forth in the following description and figures to provide a thorough understanding of various aspects of the disclosure. Certain well-known details often associated with tower elevators, lifts, and other similar suspended platforms, are not set forth in the following disclosure to avoid unnecessarily obscuring the various aspects of the disclosure. It is to be understood that the various aspects disclosed herein are not limited in application to the details of construction and the arrangement of components set forth in the following description or illustrated in the drawings. Moreover, the disclosure is capable of other embodiments and of being practiced or being carried out in various ways. Also, it is to be understood that the phraseology and terminology used herein is for the purpose of description and should not be regarded as limiting.

The present disclosure relates to a mechanical brake interrupter 10 for elevators, lifts, and other similar suspended platforms, such as traction type service lifts used in wind turbine towers. Wind turbines require routine maintenance to sustain safe and efficient operation. To perform this maintenance, service technicians must inspect and perform various tasks at different locations along the tower that are difficult to reach. Service lifts and other similar suspended platforms safely transport personnel and cargo to these different locations by ascending and descending to the different locations along the tower using a motorized hoist coupled to the service lift. It is difficult and often impossible for an operator inside the lift or other similar suspended platform to know whether an obstruction is located below the lift that may cause an undesirable impact or collision. This is especially problematic during an emergency controlled descent of the lift or other similar suspended platform when there is a loss of power that prevents an electrical obstruction switch from communicating with an electrical braking system.

FIG. 1 illustrates an exemplary drive mechanism 2 operatively connected to a hoist 4 for vertically raising and lowering a lift assembly or other similar suspended platform by a rigging 6, such as a suspension cable. In one aspect, the drive mechanism 2 may be an electric motor. A brake 8 connected to the drive mechanism 2 may be configured to stop vertical movement of the lift or other similar suspended platform in order to prevent it from free falling to the ground during a power failure that disables the electric motor. When such a loss of power occurs while the lift or other similar suspended platform is raised, an operator may manually release the brake to allow an emergency controlled descent of the lift or other similar suspended platform back to the ground so that passengers and/or cargo do not remain stuck on the lift or other similar suspended platform for an extended period of time, and a braking system may be used to control the speed of the lift or other similar suspended platform while descending. The mechanical brake interrupter of the present disclosure may be configured to interrupt the emergency controlled descent of the lift or other similar suspended platform when an obstruction, such as a person or object, is located under the lift or other similar suspended platform so as to minimize or prevent impact with the person or object.

Figures 2A, 2B:
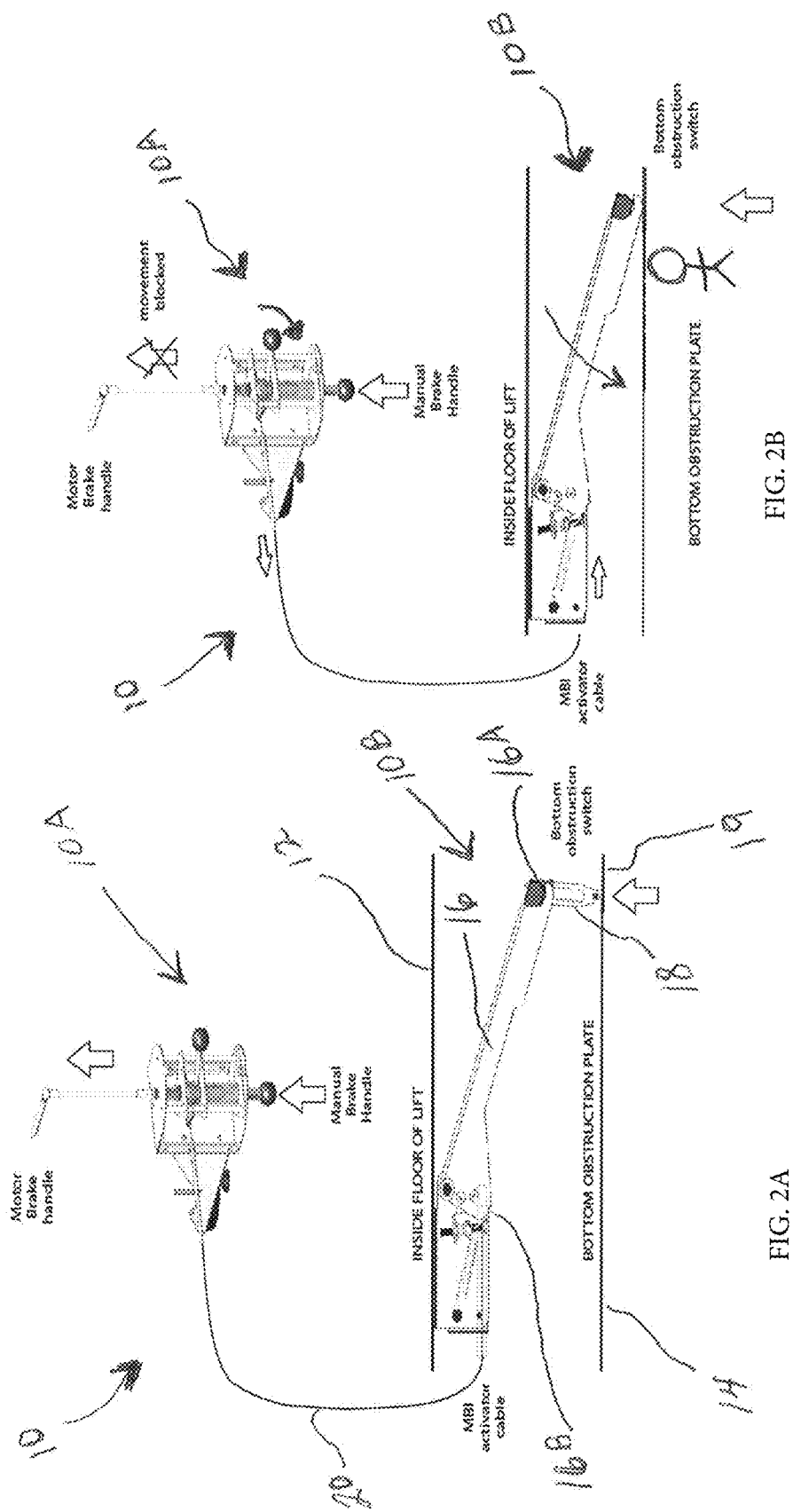
FIG. 2A illustrates a partial view of a lift assembly comprising the mechanical brake interrupter device of the present disclosure during an emergency controlled descent when no obstruction is present.
FIG. 2B illustrates a partial view of a lift assembly comprising the mechanical brake interrupter device of the present disclosure during an emergency controlled descent when an obstruction is present.
Figure 3:
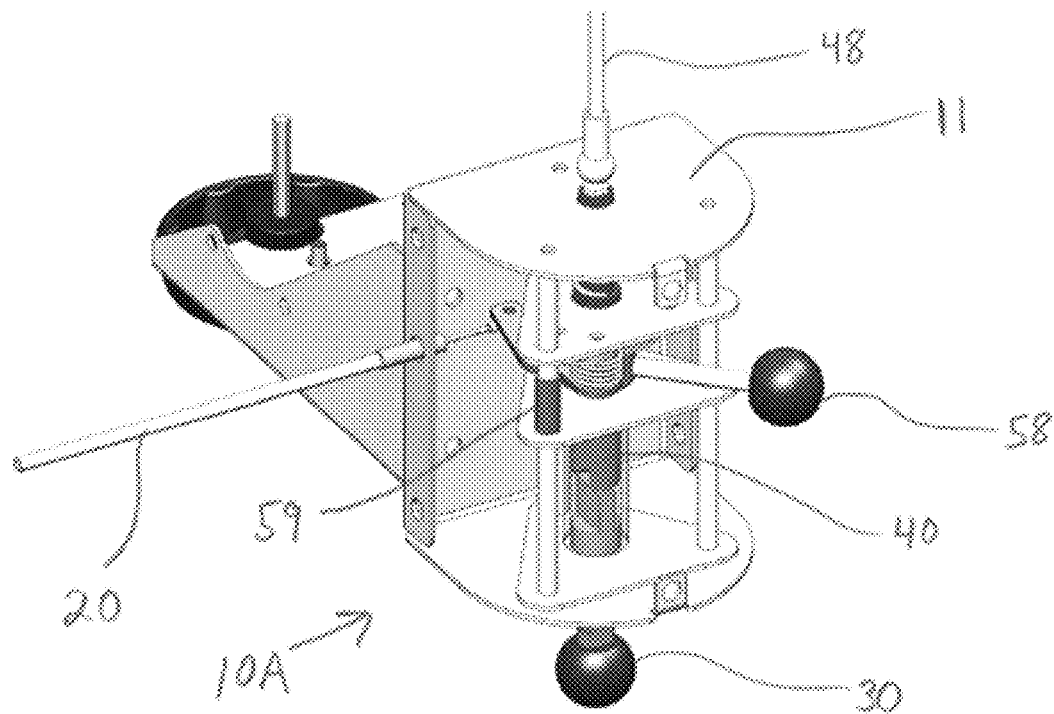
FIG. 3 illustrates a top perspective view of the control section of the mechanical brake interrupter in an armed position.
Figure 4:
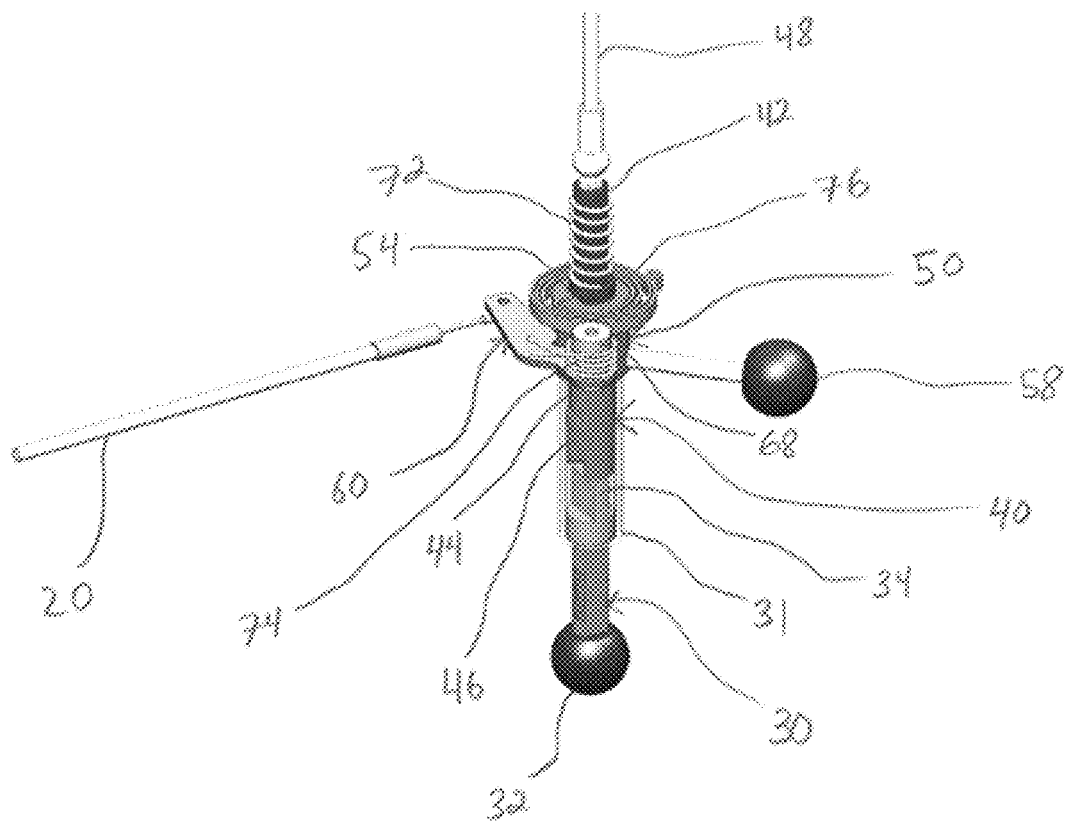
FIG. 4 illustrates a perspective view of the components of the control section of the mechanical brake interrupter in an armed position.
Figure 5:
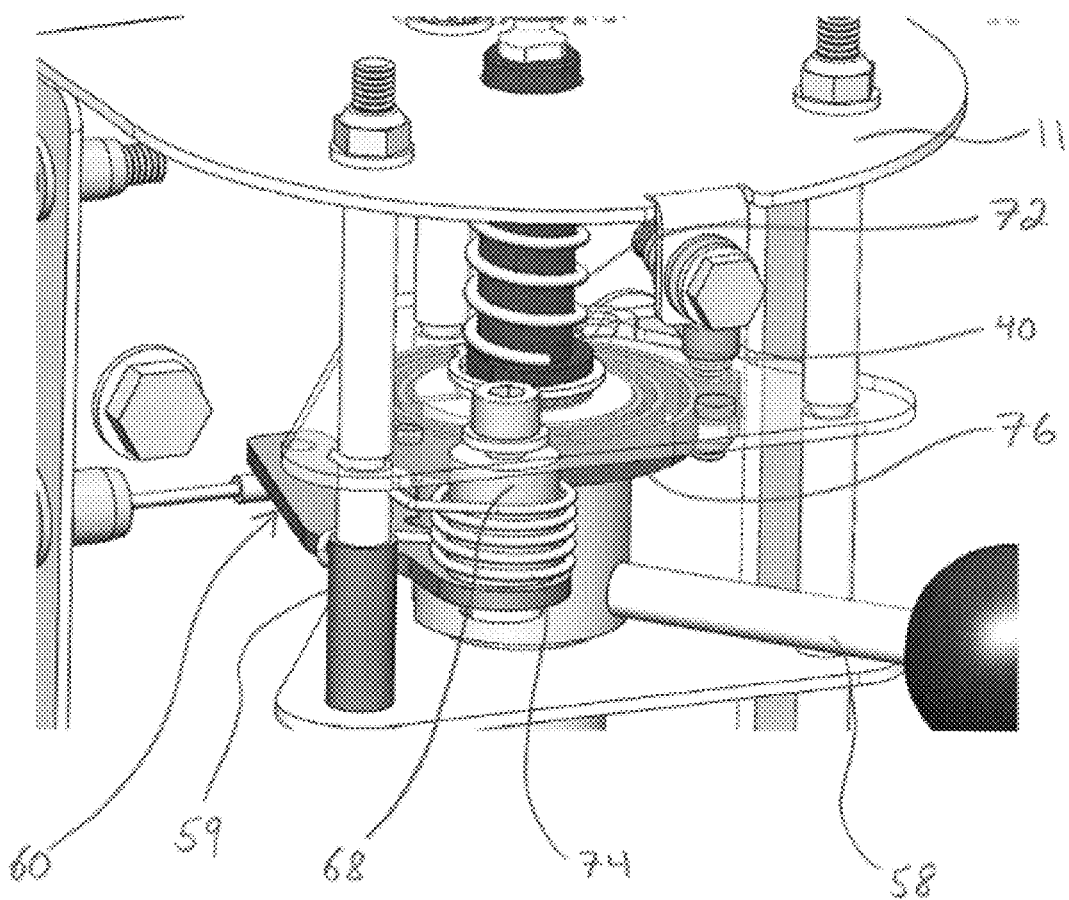
FIG. 5 illustrates a close-up perspective view of the control section of the mechanical brake interrupter in an armed position.
Figure 6:
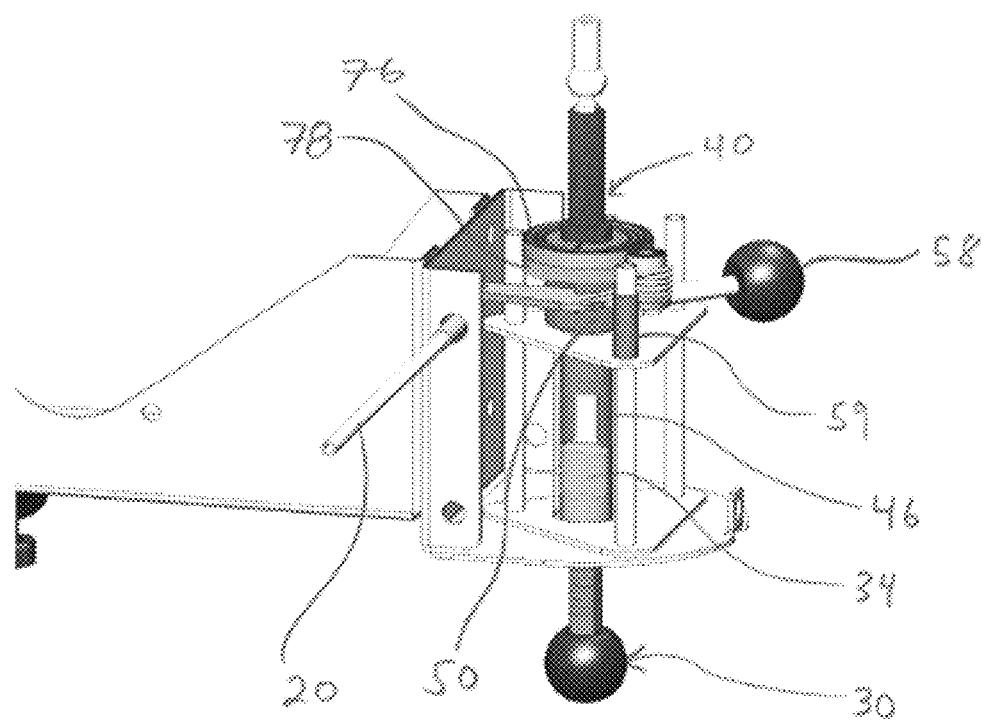
FIG. 6 illustrates a side elevation view of the control section of another implementation of the mechanical brake interrupter in an armed position.

FIG. 2A depicts the mechanical brake interrupter 10 in a non-activated, or armed, position, such as during an emergency controlled descent when there is no obstruction present below the lift assembly or other similar suspended platform. The mechanical brake interrupter 10 comprises an upper brake interrupter 10A section defining a control section, a lower brake interrupter section 10B defining an obstruction section, and an activator line 20, such as a steel cable, rope, or wire. Each end of the activator line 20 may respectively connected to the control section and the obstruction section, as will be discussed in more detail below. FIG. 1 shows the control section 10A of the mechanical brake interrupter 10 is connected to the drive mechanism 2.

Referring again to FIG. 2, the obstruction section 10B comprises an obstruction lever 16 pivotally provided between a bottom obstruction plate 14 and an inside floor 12 of the lift or other similar suspended platform. The obstruction lever 16 may include a first end 16A pivotally and slidably connected to a guide member 18 that is pivotally secured to the obstruction plate 14, and a second end 16B pivotally connected to the inside floor 12 of the lift or other similar suspended platform. The second end 16B of the obstruction lever 16 may also securely connected to a lower end of the activator line 20, and an upper end of the activator line 20 is securely connected to the control section 10A. The obstruction plate 14 may be movable relative to the lift floor 12, such that the obstruction plate 14 is urged toward the lift floor 12 upon contact with an obstruction located below the lift assembly or other similar suspended platform during an emergency controlled descent operation.

FIG. 2B depicts the mechanical brake interrupter 10 in an activated position during an emergency controlled descent when there is an obstruction, such as a person or object, located below the lift assembly or other similar suspended platform. As the lift or other similar suspended platform descends, the bottom obstruction plate 14 contacts the obstruction, thus causing the obstruction plate 14 to move toward the lift floor 12. When the obstruction plate 14 is forced toward the lift floor 12 due to contact with an obstruction below the lift assembly or other similar suspended platform, the obstruction lever 16 may correspondingly rotate into a collapsed position between the obstruction plate 14 and the lift floor 12. In one aspect, the obstruction lever 16 rotates approximately 45°. As the obstruction plate 14 is compressed toward to the lift floor 12, the first end 16A of the obstruction lever 16 may pivot along the guide member 18, and the second end 16B of the obstruction lever 16 may pivot and pull on the activator line 20.

Under normal operating conditions when there is no loss of power to the lift assembly or other similar suspended platform, the first end 16A of the obstruction lever 16 may be guided along the guide member 18 until it contacts an electrical obstruction switch 19 configured to automatically stops the lift's descent. When there is a loss of power, however, the second end 16B of the obstruction lever 16 may pull the lower end of the activator line 20, which correspondingly causes the upper end of the activator line 20 to mechanically interrupt an emergency controlled descent of the lift or other similar suspended platform.

The control section 10A of the mechanical brake interrupter 10 is shown in the armed position in FIGS. 3 through 10. The control section 10A comprises a housing 11, which may include a manual brake handle 30, a coupling member 40, a control collar 50, and an activation lever 60. The manual brake handle 30 may be located within a guide shaft and may be slidably movable up and down in the vertical direction. The manual brake handle 30 may include a grip end 32 and an opposite male fitting end 34. The coupling member 40 may generally be cylindrical and may be partially located within the guide shaft 31. The coupling member 40 may be slidably movable up and down in the vertical direction relative to the control collar 50, and is also rotatable relative to the brake handle 30.

The coupling member 40 may include an upper portion 42 fixedly coupled to a brake line 48, an intermediate portion 44 slidably coupled to the control collar 50, and a lower portion 46 defining a female fitting end 46 that may be selectively engageable with the male fitting end 34 of the brake handle 30. The coupling member 40 may be biased vertically downward in the direction toward the manual brake handle 30 by a first biasing member 72, such as a compression spring.

Figure 7:
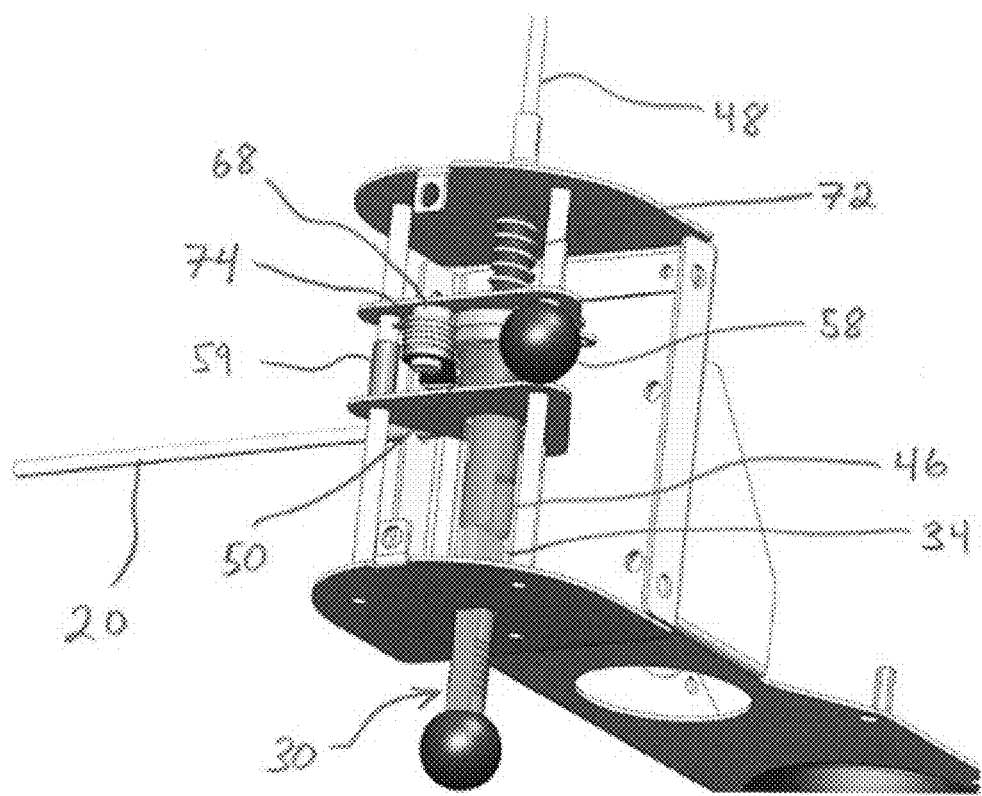
FIG. 7 illustrates a bottom perspective view of the control section of the mechanical brake interrupter of FIG. 6 in an armed position.
Figure 8:
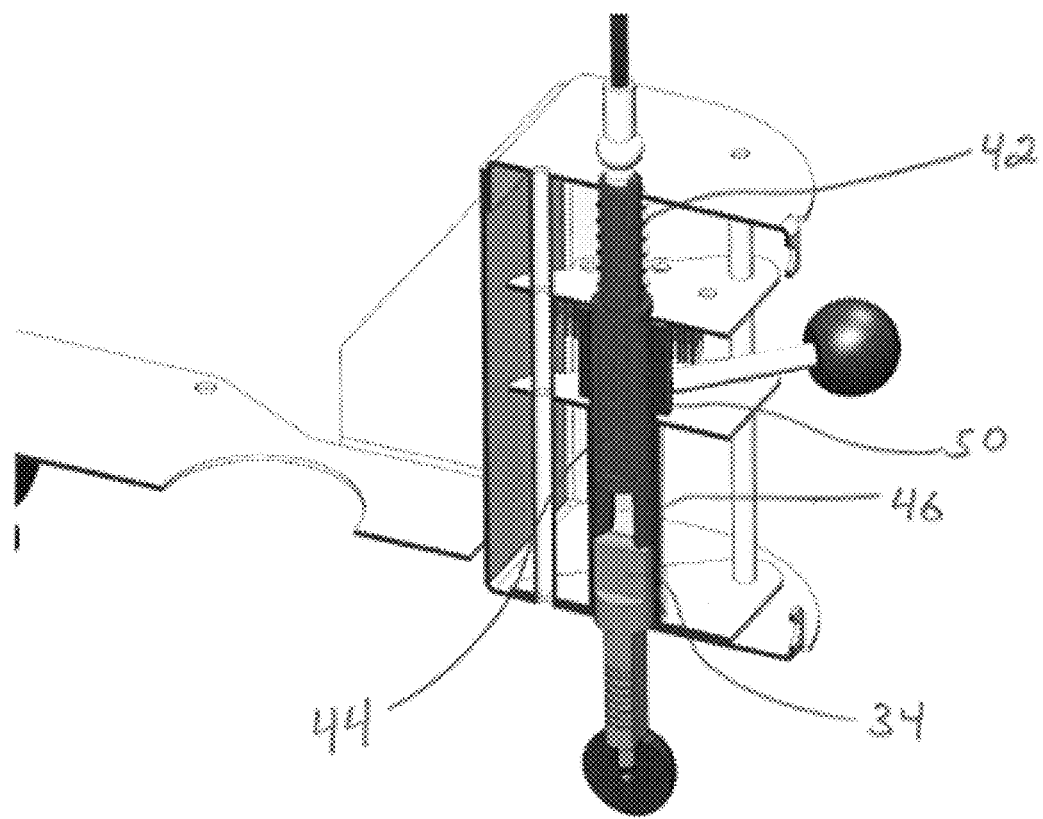
FIG. 8 illustrates a cross-sectional view of the control section of the mechanical brake interrupter of FIG. 6 in an armed position.

The intermediate portion 44 of the coupling member 40 may define a longitudinal anti-rotation interface formed along its outer surface for slidably mating with a corresponding anti-rotation interface of the control collar 50. For example, as shown in FIG. 7 the anti-rotation interface 44 of the coupling member 40 may be a flat indent formed on its outer surface. In one aspect, the corresponding anti-rotation interface 54 of the control collar 50 may define a flat interior surface. Thus, any rotation of the control collar 50 correspondingly causes rotation of the coupling member 40.

Figure 9:
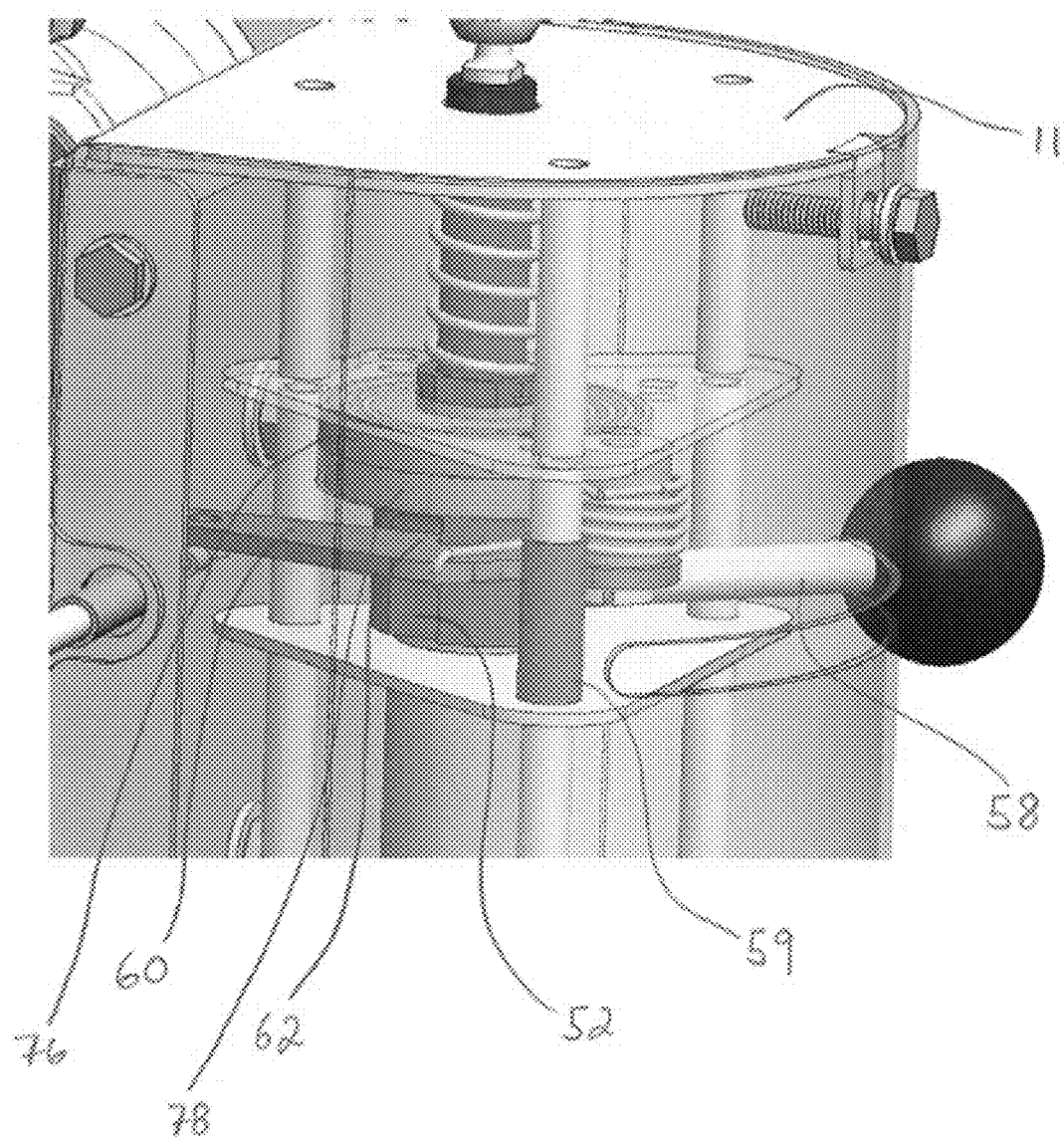
FIG. 9 illustrates a close-up side elevation view of the control section of the mechanical brake interrupter of FIG. 6 in an armed position.
Figure 10:
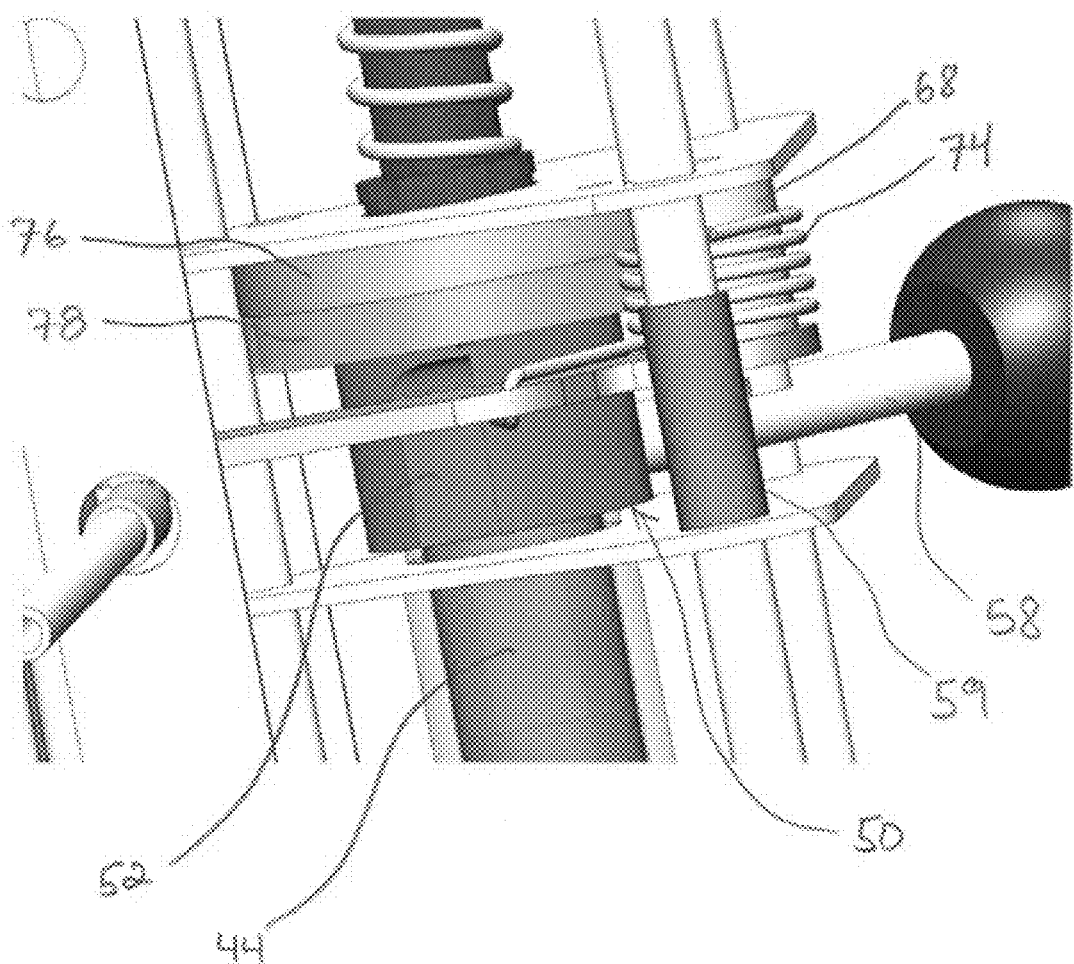
FIG. 10 illustrates another close-up side elevation view of the mechanical brake interrupter according to FIG. 6.

The activation lever 60 may have a first end secured to the activation line 20, a second end rotatably secured to a support shaft 68, and an intermediate portion defining a lock member 62 that may be configured to releasably engage a corresponding catch or notch 52 provided on the outer surface of the control collar 50, as shown for example in FIGS. 9 and 10. A second biasing member 74, such as a coil spring, may be connected to the support shaft 68 and may bias the activation lever 60 toward the control collar 50. The upper end of the activator line 20 may be connected to the control section 10A, and more particularly, to the activation lever 60.

When the activator line 20 is pulled by the obstruction lever 16, as discussed above, the activator line 20 may correspondingly pull the activation lever 60 out of locking engagement with the control collar 50. A third biasing member 76 may be connected to the control collar 50 and may be configured to rotatably bias the control collar 50 toward the activated position. For example, the third biasing member may be radially wound to provide a spring biasing force in the clockwise direction. In one aspect of the disclosure, the third biasing member 76 may be a clock spring. In another aspect, the third biasing member 76 may be a torsion spring. It should be appreciated that a plurality of third biasing members 76 may be connected to the control collar 50 to rotatably bias the control collar 50 toward the activated position depending on how much biasing force is needed to rotate the control collar 50. For example, FIGS. 6 through 10 depict an exemplary implementation of the mechanical brake interrupter 10 comprising a top third biasing member 76 and a bottom third biasing member 78 configured to rotatably bias the control collar 50 toward the activated position.

When there is a loss of power to the lift or other similar suspended platform, the operator can push up on the grip end 32 of the manual brake handle 30 so that the brake handle 30 contacts the coupling member 40 and correspondingly pushes it up. The brake line 48 may be movably connected to the coupling member 40 and may therefore be pushed up therewith. Pushing up on the brake line 48 activates an emergency controlled descent of the lift or other similar suspended platform. When the operator releases the brake handle 30, the brake handle 30 may slide back down to its original position due to the effect of gravity. The first biasing member 72 constantly biases the coupling member 40 to slide back down to its original position, which correspondingly pulls down the brake line 48 to halt the controlled descent of the lift or other similar suspended platform. Thus, the upward force imparted on the manual brake handle 30 by the operator must overcome the opposing biasing force imparted on the coupling member 40 by the first biasing member 72 in order to push the coupling member 40 and brake line 48 up to activate the emergency controlled descent (e.g., temporarily or partially disengage braking).

The operator can continue to push up on the manual brake handle 30 to correspondingly raise the coupling member 40 and the brake line 48 in order to continue the controlled descent of the lift or other similar suspended platform even when an obstruction below is present. When the bottom obstruction plate 14 of the lift or other similar suspended platform contacts the obstruction, the obstruction lever 16 is forced to rotate toward an activated position which causes tension in the activator line 20. This tension in the activator line 20 counteracts the biasing force of the second biasing member 74 and pulls the activation lever 60 out of locking engagement with the control collar 50. For instance, the activation line 20 may pull the activation lever 60 so that is rotates away from the control collar 50. The lock member 62 of the activation lever therefore disengages the receiving notch 52 formed on the control collar 50. As a result, the rotational biasing force applied to the control collar 50 by the third biasing member 76 causes the control collar 50 to rotate clockwise.

Figure 11:
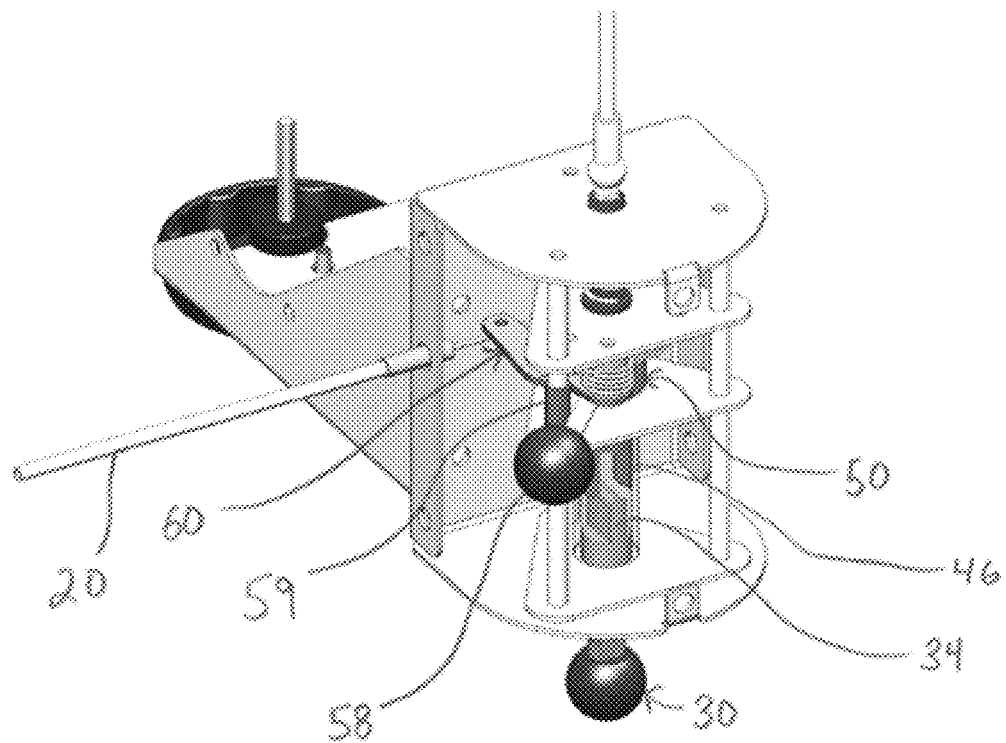
FIG. 11 illustrates a top perspective view of the control section of the mechanical brake interrupter in an activated position.

Rotation of the control collar 50 is stopped when a reset handle 58 radially extending therefrom abuts against a stop member 59 of the housing, as illustrated in FIG. 11. The amount of rotation of the control collar 50 is approximately 90°. Further, the rotation of the control collar 50 correspondingly causes the coupling member 40 to rotate therewith by approximately 90° due to the conforming anti-rotation interface portions 44, 54 formed on each of the control collar 50 and the coupling member 40.

By rotating the coupling member 40 approximately 90° along with the control collar 50, the female fitting end 46 of the coupling member 40 turns into mating alignment with the male fitting end 34 of the brake handle 30, as illustrated in FIG. 11, in which the mechanical brake interrupter 10 is shown in the activated position. As a result, the first biasing member 72 urges the coupling member 40 to move downward in the direction toward the brake handle 30. The female fitting end 46 of the coupling member 40 and the male fitting end 34 of the brake handle 30 have a clearance fit that allows the coupling member 40 to be urged downward without contacting the brake handle 30 even when the operator continues to push up on the brake handle 30.

Stated another way, when the mechanical brake interrupter 10 is in the activated position as shown in FIG. 11, the female fitting end 46 of the coupling member 40 is configured to receive the male fitting end 34 of the brake handle 30 without imparting an axial force on the coupling member 40 when the operator pushes up on the handle. It should be appreciated that the manual brake handle 30 is non-rotatable within the guide shaft 31 in order to prevent an operator from accidentally aligning the male and female fitting ends of the respective brake handle 30 and coupling member 40 when the brake interrupter 10 is in the non-activated position as shown in FIGS. 3-10. When the brake line 20 is pulled away from the control member 50 while the operator is pushing up on the manual brake handle 30, the coupling member 40 descends into mating alignment with the brake handle 30, thus pulling down the brake line 48 and causing the emergency controlled descent of the lift or other similar suspended platform to stop to thereby minimize or prevent impact with the obstruction located underneath the lift.

Once the obstruction has been removed and the operator wants to resume the emergency controlled descent of the lift or other similar suspended platform, the mechanical brake interrupter 10 must be reset from the activated position to the armed position. If the brake interrupter 10 is not reset, it will remain in the activated position, such that pushing up on the manual brake handle 30 will not correspondingly push up on the coupling member 40 and brake line 48 since the female fitting end 46 of the coupling member 40 will stay matingly aligned with the male fitting end 34 of the brake handle 30. As previously described, when the female and male fitting ends of the respective coupling member 40 and brake handle 30 are matingly aligned, sliding the brake handle 30 toward the coupling member 40 will not raise the coupling or brake line 48 since the male fitting end 34 is received in the female fitting end 46.

To reset the mechanical brake interrupter 10, the operator rotates the control collar 50 counterclockwise by manipulating the reset handle 58 extending therefrom until the lock member 62 of the activation lever 60 re-engages the notch 52 on the control collar 50. The operator must move the reset handle against the biasing force provided by the third biasing member 76. The activation lever 60 is constantly biased by the second biasing member 74 to pivot toward the control collar 50. As the control collar 50 rotates back to its original position in the armed state, the lock member 62 of the activation lever remains biased against the annular surface of the control collar 50. Once the control collar 50 rotates back by approximately 90°, the lock member 62 can engage the notch 52 of the control collar 50 to lock the control collar 50 in place, thereby causing the activation lever 60 to pivot toward the control collar 50 and consequently pull on the activation line to reset the brake interrupter 10 back to an armed position.

As the control collar 50 is manipulated to rotate back to the armed position by the operator, the coupling member 40 also rotates back approximately 90° to the armed position. As previously described, the coupling member 40 may rotate together with the control collar 50 due to the respective anti-rotation interfaces. In one implementation, as shown in FIG. 7, the anti-rotation interface of the coupling member 40 is a flat wall portion 44 formed on the outer annular surface of the coupling member 40, and the corresponding anti-rotation interface of the control collar 50 is a flat wall portion 54 formed on the inner annular surface of the control collar 50.

Once the brake interrupter 10 is returned back to the armed position, the female fitting end 46 of the coupling member 40 no longer matingly aligns with the male fitting end 34 of the brake handle 30. Rather, the male fitting end 34 is arranged substantially perpendicular to an opening of the female fitting end 46 such that when an operator pushes up on the brake handle 30, the male fitting end 34 contacts the coupling member 40 in order to correspondingly push the up on the coupling member 40 and raise the brake line, as illustrated especially in FIGS. 5-7. Thus, the operator can resume operation of the emergency controlled descent.

In an embodiment, a mechanical brake interrupter device for a suspended platform may be implemented. The mechanical brake interrupter device comprises:

a manual brake handle configured to manipulate a brake line for performing an emergency controlled descent of the suspended platform;

a control collar rotatable between an armed position and an activated position;

a coupling member having an upper portion connected to the brake line, a lower portion selectively engageable with the manual brake handle, and an intermediate portion slidably connected to the rotatable control collar; and a pivotable activation lever configured to releasably lock the control collar in the armed position and unlock the control collar in the activated position;

wherein rotating the control collar correspondingly rotates the coupling member such that the manual brake handle selectively engages the coupling member when the control collar is in the armed position, and the manual brake handle does not selectively engage the coupling member when the control collar is in the activated position.

In an embodiment, the mechanical brake interrupter device comprises an obstruction plate coupled to the control collar, the obstruction plate being movable relative to a floor of the platform such that the obstruction plate is urged toward the floor in response to contact with an obstruction located below the platform.

In an embodiment, the obstruction plate is coupled to an obstruction lever configured to rotate into a collapsed position between the obstruction plate and the floor.

In an embodiment, a lift comprises:

a manual brake handle configured to manipulate a brake line for performing an emergency controlled descent of the lift;

a control collar rotatable between an armed position and an activated position;

a coupling member having an upper portion connected to the brake line, a lower portion selectively engageable with the manual brake handle, and an intermediate portion slidably connected to the rotatable control collar; and a pivotable activation lever configured to releasably lock the control collar in the armed position and unlock the control collar in the activated position;

wherein rotating the control collar correspondingly rotates the coupling member such that the manual brake handle selectively engages the coupling member when the control collar is in the armed position, and the manual brake handle does not selectively engage the coupling member when the control collar is in the activated position.

In an embodiment, a device comprises:

a brake handle configured to manipulate a controlled descent of a lift;

a control collar having an armed position and an activated position; and a pivotable activation lever configured to releasably lock the control collar in an armed position and unlock the control collar in an activated position;

wherein rotating the control collar correspondingly rotates a coupling member such that the brake handle selectively engages the coupling member when the control collar is in the armed position, and the brake handle does not selectively engage the coupling member when the control collar is in the activated position.

In an embodiment, the coupling member has an upper portion coupled to a brake line, a lower portion selectively engageable with the brake handle, and an intermediate portion slidably connected to the control collar.

In an embodiment, the brake line is coupled to an obstruction plate that is movable relative to a floor of the lift, such that the obstruction plate is urged toward the lift floor upon contact with an obstruction located below the lift.

The foregoing description has set forth various aspects of the mechanical brake interrupter 10 via the use of diagrams and examples. While the present disclosure has been described in connection with the preferred embodiments of the various figures, it is to be understood that other similar embodiments may be used or modifications and additions may be made to the described embodiment for performing the same function of the present disclosure without deviating therefrom. Furthermore, it should be emphasized that a variety of applications beyond use in elevators, service lifts, and other similar suspended platforms are herein contemplated. Therefore, the present disclosure should not be limited to any single embodiment, but rather construed in breadth and scope in accordance with the appended claims. Additional features of this disclosure are set forth in the following claims. As such, it is not desired to limit the mechanical brake interrupter to the exact construction and operation described and illustrated and, accordingly, all suitable modifications and equivalents may fall within the scope of the claims.

What is claimed:

1. A mechanical brake interrupter device for a suspended platform, the mechanical brake interrupter device comprising:

a manual brake handle configured to manipulate a brake line for performing an emergency controlled descent of the suspended platform;

a control collar rotatable between an armed position and an activated position;

a coupling member having an upper portion connected to the brake line, a lower portion selectively engageable with the manual brake handle, and an intermediate portion slidably connected to the rotatable control collar; and a pivotable activation lever configured to releasably lock the control collar in the armed position and unlock the control collar in the activated position;

wherein rotating the control collar correspondingly rotates the coupling member such that the manual brake handle selectively engages the coupling member when the control collar is in the armed position, and the manual brake handle does not selectively engage the coupling member when the control collar is in the activated position.

2. The mechanical brake interrupter device of claim 1, further comprising an obstruction plate coupled to the control collar, the obstruction plate being movable relative to a floor of the platform such that the obstruction plate is urged toward the floor in response to contact with an obstruction located below the platform.

3. The mechanical brake interrupter device of claim 2, wherein the obstruction plate is coupled to an obstruction lever configured to rotate into a collapsed position between the obstruction plate and the floor.

4. A lift comprising:

a manual brake handle configured to manipulate a brake line for performing an emergency controlled descent of the lift;

a control collar rotatable between an armed position and an activated position;

a coupling member having an upper portion connected to the brake line, a lower portion selectively engageable with the manual brake handle, and an intermediate portion slidably connected to the rotatable control collar; and a pivotable activation lever configured to releasably lock the control collar in the armed position and unlock the control collar in the activated position;

wherein rotating the control collar correspondingly rotates the coupling member such that the manual brake handle selectively engages the coupling member when the control collar is in the armed position, and the manual brake handle does not selectively engage the coupling member when the control collar is in the activated position.

5. A device comprising:

a brake handle configured to manipulate a controlled descent of a lift;

a control collar having an armed position and an activated position; and a pivotable activation lever configured to releasably lock the control collar in an armed position and unlock the control collar in an activated position;

wherein rotating the control collar correspondingly rotates a coupling member such that the brake handle selectively engages the coupling member when the control collar is in the armed position, and the brake handle does not selectively engage the coupling member when the control collar is in the activated position.

6. The device of claim 5, wherein the coupling member has an upper portion coupled to a brake line, a lower portion selectively engageable with the brake handle, and an intermediate portion slidably connected to the control collar.

7. The device of claim 6, wherein the brake line is coupled to an obstruction plate that is movable relative to a floor of the lift, such that the obstruction plate is urged toward the lift floor upon contact with an obstruction located below the lift.

* * * * *